Sept. 8, 1959 J. B. HENNION 2,903,273
SHOPPING CART – IMPROVED WHEEL ARRANGEMENT
Filed Feb. 10, 1958
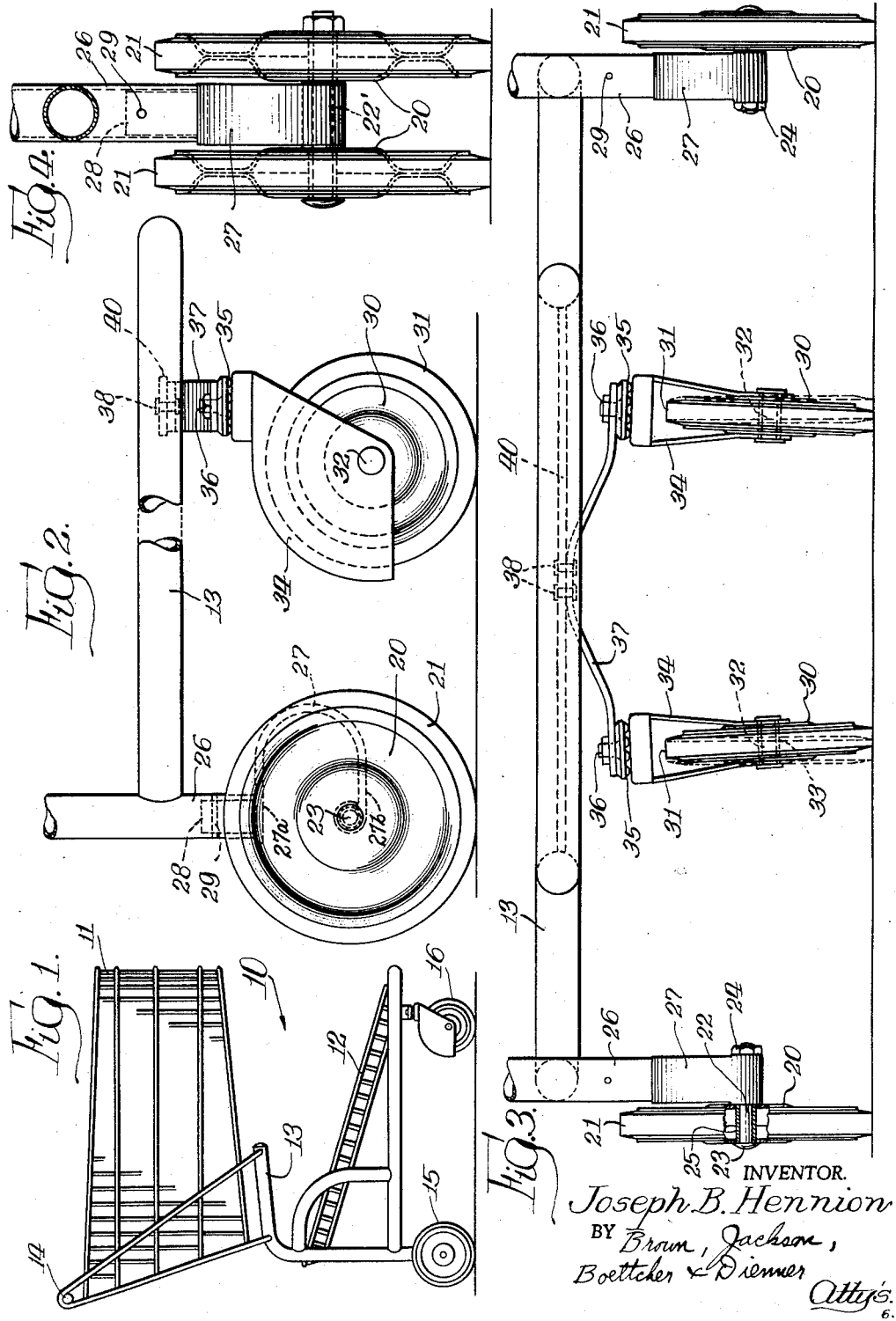
INVENTOR.
Joseph B. Hennion
BY Brown, Jackson,
Boettcher & Dienner
Attys.

United States Patent Office 2,903,273
Patented Sept. 8, 1959

2,903,273
SHOPPING CART, IMPROVED WHEEL ARRANGEMENT

Joseph B. Hennion, Niles, Mich., assignor to Tyler Refrigeration Corporation, Niles, Mich., a corporation of Michigan Application February 10, 1958, Serial No. 714,181

8 Claims. (Cl. 280—124)

This invention relates, in general, to shopping carts of the type used in present food markets and the like, and relates in particular, to an improved wheel arrangement for such carts.

Known shopping carts incorporate a U-shaped main frame, usually supporting an upper and lower tray or basket, are usually arranged so that the frame and the upper and lower baskets may be telescoped with like elements of similar carts, and are known to include front caster type wheels to permit turning of the cart and rear stationary wheels, all of which may be mounted or supported on coil springs to absorb shocks and the like when the cart is loaded with merchandise. Such known telescoping type shopping carts usually include, also, an arrangement whereby the lower tray or basket is normally disposed, when free of merchandise, forwardly inclined or tilted for telescopic association with a like part of another cart, and further improvements in such carts include the slideability and removeability of the lower basket as well as a means whereby notification may be given when merchandise is on such lower tray.

Examples of such known shopping carts are shown and claimed, for example, in my co-pending patent application, Serial No. 618,075, entitled "Telescoping Shopping Cart" filed October 24, 1956, and my co-pending patent application, Serial No. 697,136, entitled "Telescoping Shopping Cart; Checkout Signal" filed November 18, 1957, to which reference is hereby made for a full disclosure of such carts.

In the shopping carts of the type disclosed in the above-identified patent applications, it has been found that such carts could further be improved by making the cart more mobile and by providing the carts with a wheel arrangement which was cheaper to manufacture and maintain.

Accordingly, it is a primary object of my present invention to provide an improved shopping cart having a new and improved wheel arrangement permitting easier mobility when such carts are loaded with merchandise, which wheel arrangement is less expensive to manufacture and maintain than present-day wheel arrangements in carts of this type.

Briefly, my invention contemplates in known shopping carts of the type disclosed in my co-pending patent applications and as an improvement in the wheel arrangement thereover, an improved wheel arrangement including U-shaped springs suspending the rear wheels and a leaf spring suspension of the front wheels as well as thinner wheels which reduces the area of traction resulting in less force to push the carts about. Each wheel is further provided with a new and improved shaft bearing arrangement and as of the spring suspension system, contributes to making such wheel arrangements less expensive to manufacture and to maintain.

Accordingly, still another object of my invention is the provision of spring suspended wheels in a shopping cart so constructed and arranged for improved mobility. Still another object of my invention is the provision of a wheel arrangement in telescoping shopping carts so constructed and arranged to utilize less expensive and narrower wheels and less expensive bearing shaft arrangements which are cheaper to manufacture and less expensive to maintain.

Other and more particular objects of my invention will be apparent to those skilled in the art from the following description and drawings forming a part hereof and wherein:

Fig. 1 is a perspective view illustrating a conventional telescoping shopping cart in which my improved wheel arrangement may be typically installed;

Fig. 2 is an enlarged elevational view illustrating to advantage the detailed construction of my new wheel arrangement typically installed in the lower portion of a conventional telescoping shopping cart;

Fig. 3 is an enlarged front view of the wheel arrangement illustrated in Fig. 2; and Fig. 4 is a partial front view of another arrangement of the rear wheels of my invention.

Turning now to the drawings, and in particular to Fig. 1 thereof, it can be seen that my shopping cart, indicated in its entirety as 10, comprises an upper basket 11, a lower basket or tray 12 and a tubular frame member 13. The upper portion of frame 13 is provided with a handle 14 and the lower portion of the frame has a pair of rear wheels 15 and a pair of front caster wheels 16, suitably affixed thereto to permit the transportation of the cart by means of the handle 14.

Telescoping carts of the type shown in Fig. 1 are more fully disclosed in my co-pending applications, above referred to, reference being hereby made thereto for a full disclosure thereof. However, it is sufficient to say herein for the understanding of my present invention that the frame 13 of such carts is U-shaped and substantially open at the rear, with the lower basket 12 inclined or tilted towards the front, and with the back or rear walls of the upper basket 11 being mounted for tilting forwardly or inwardly and upwardly, such arrangement permitting the internesting or telescoping relationship with like parts of similar carts. As a still further improvement, such known shopping carts may be provided with coil type spring shock absorbers for suspending the rear wheels 15 and the front wheels 16 on the frame.

As further hereinbefore mentioned, an outstanding feature of my present invention is to provide a wheel arrangement which will permit such carts to move about more readily when loaded by providing thinner wheels and which will be less expensive to manufacture and maintain.

Turning now in more detail to my present invention which accomplishes the previously mentioned features, attention is invited to Figs. 2 and 3 thereof where it can be seen that the rear wheels 15 each comprise a relatively large, relatively narrow wheel 20 having a relatively thin tire tread, as illustrated at 21, mounted for rotatable movement on a horizontally disposed axle in the form of a bolt having a head 23 and a nut 24. Axle 22 is journalled in a suitable relatively long, thin bearing 25 in the wheel 20, preferably of the plastic known on the market as Teflon and is suspended from a hollow vertical extension 26 of the frame 13 by a U-shaped spring 27. Spring 27 is provided at one end of leg 27a with an upwardly extending plug or cylindrical member 28 receivable within the tubular extension 26 and tubular extension 26 and plug 28 are suitably bored to receive a pin 29 to affix the spring 27 within the tubular extension and to prevent it from turning about its vertical axis. The other end of leg 27b of the U-shaped spring 27 is turned back on itself (see Fig. 2) to form a cylindrical container to further journal the axle 22 and is preferably Teflon coated.

With the legs 27a and 27b of the spring 27 so formed and disposed, legs 27a and 27b define an opening which, in the amendment shown, faces in the direction of the backward travel of the shopping cart; that is to say, the legs are mounted normal to the axis of rotation of the wheels or disposed so that their respective planes of operation are parallel to the direction of travel of the rear wheels.

It is to be noted in Fig. 2 of the drawings, that the center line of the axis of rotation of the wheels 21 is approximately the same as the center line of the plug 28 and the tubular extension 26 so that the load on the frame 13 by the merchandise in the upper and lower trays of the cart is properly taken up by the wheels and spring.

I have found by use of the U-shaped spring that I am able to use the relatively narrow wheels 20 with the relatively narrow tread 21 which, when loaded present a relatively small tread area, thus taking less force to move the cart about when loaded. This differs from prior art devices having spring suspended, relatively thick wheels and which, even when provided with a central raised portion or camber, enough friction still remains to make it difficult to move the cart about especially when the central camber wears. Too, any spring suspension system utilizing coil springs is too expensive to be commercially acceptable.

Turning now to the front wheels 16, it can be seen that each wheel is a relatively thin wheel 30 smaller than the rear wheels and has a relatively narrow tire tread, as illustrated at 31, mounted on a substantially horizontally disposed axle 32. Axle 32 is in turn journalled in any suitable plastic or plastic coated bearing 33, such as and preferably Teflon, mounted on a bifurcated swivel-mounted caster 34 which partially covers the wheel and is rotatable about its vertical axis in the conventional manner, having any suitable bearing means such as ball bearing 35 to easily accomplish this purpose. Caster 34 is in turn suitably mounted, as by bolt means 36, on one end of a spring steel leaf spring 37; the central portion of which is suitably fixedly attached as by rivets 38 to the front center portion of the frame 13 as illustrated and by a brace member 40 welded to frame 13 and so constructed and arranged whereby the casters 34 and wheels 30 are allowed to move upwardly and downwardly relative to the frame 13 under load. To accommodate the arc type movement provided by the leaf spring 37, the front wheels are cambered slightly inwardly as illustrated. By this arrangement of the front wheels, the internestability of my carts is not diminished.

In certain applications where it is found that the average load in the shopping cart is heavier, such loads can easily be accommodated by the provision of the second wheel in dual relationship with the first wheel, such as illustrated in Fig. 4; the axle 22 being elongated to accommodate the two wheels. This dual wheel arrangement has also been found to present less tread area than the normal thick wheel arrangement of prior art devices lessening the force necessary to move the loaded cart about.

Where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. A telescoping shopping cart having a frame, load supporting means on said frame, said frame being tapered toward its front whereby its front is narrower than its rear, load supporting means comprising a basket having means for permitting like baskets to be telescopingly nested therein, means including rear wheels spaced apart on said cart, means for suspending the said rear wheels on said frame including a pair of U-shaped spring means between the frame and the rear wheels, said spring means being arranged so that their respective planes of operation are parellel to the direction of movement of said rear wheels, means including front caster wheels on said cart, and means to suspend said caster wheels spaced apart on said frame including single leaf type spring means extending transversely of said cast between said frame and said front caster wheels, said leaf type spring means being shorter than the distance between the rear wheels, and said caster wheels being attached to the ends of said leaf type spring means whereby the front caster wheels on one cart may pass between the rear wheels of a like cart to permit the telescoping nesting of said carts and baskets and whereby the wheels are so suspended that they may be relatively thin with less tread area producing less friction with a floor.

2. The telescoping shopping cart claimed in claim 1 further including plastic bearing means for each of said wheels.

3. A telescoping shopping cart having a frame, load supporting means on said frame, said frame being tapered toward its front whereby its front is narrower than its rear, said supporting means comprising a basket having means for permitting like baskets to be telescopingly nested therein, means including a pair of dual rear wheels, one of said pair being spaced apart from the other of said pair on said cart, means for suspending the said rear dual wheels on said frame including U-shaped spring means between the frame and each pair of dual rear wheels, said spring means being arranged so that its plane of operation is parallel to the direction of movement of said rear wheels, means including front caster wheels on said cart, and means to suspend said caster wheels spaced apart on said frame, including single leaf type spring means extending transversely of said cart between said frame and said front caster wheels, said leaf type spring means being shorter than the distance between the rear wheels and said caster wheels being attached to the ends of said leaf type spring means whereby the front caster wheels on one cart may pass between the rear wheels of a like cart to permit the telescoping nesting of said carts and baskets and whereby the wheels are so suspended that they may be relatively thin with less tread area producing less friction with a floor.

4. The telescoping shopping cart claimed in claim 3 further including plastic bearing means for each of said wheels.

5. In a shopping cart having a frame and one or more package supporting means adapted to be loaded with merchandise, said frame and package supporting means including means for permitting said carts to be telescoped with like parts of similar carts, means including rear wheel means spaced apart at the rear of said cart and front caster wheel means spaced apart at the front of said cart, means to suspend said rear wheel means on said cart including U-shaped spring means between the frame and each of the rear wheel means, means to suspend said front caster wheel means on said cart including a single leaf type spring means extending transversely of said cart between the frame and the front caster wheel means, said U-shaped spring means having upper and lower legs disposed normal to the axis of rotation of said rear wheel means and said leaf type spring means being shorter than the distance between said rear wheel means whereby the front caster wheels of said cart may pass between the rear wheels of similar carts for nesting with said similar carts and whereby the wheels so suspended may be relatively thin with less tread area producing less friction with a floor.

6. In a shopping cart having a frame and one or more package supporting means adapted to be loaded with merchandise, said frame and package supporting means including means permitting said cart to be telescoped with like parts of similar carts, means including rear wheels and front caster wheels, means to suspend said rear wheels spaced apart on said cart including U-shaped spring means having upper and lower legs spaced apart and disposed normal to the axis of rotation of said rear wheels and between the frame and each of the rear wheels, one end of each said spring means forming a journal, an axle journalled in each said wheels and said spring means, and means to suspend said caster wheels spaced apart on said cart including single leaf type spring means extending transversely of said cart between the frame and the front caster wheels, said leaf type spring means being shorter than the distance between the rear wheels and said caster wheels being attached to the ends of said leaf spring means whereby the caster wheels of said cart may pass between the rear wheels of similar carts for nesting with said similar carts and whereby the wheels so suspended may be relatively thin with less tread area producing less friction with a floor.

7. In a shopping cart having a frame and one or more package supporting means adapted to be loaded with merchandise, said frame and package supporting means including means permitting said cart to be telescoped with like parts of similar carts, means including rear wheels and front caster wheels, means to suspend said rear wheels spaced apart on said cart including U-shaped spring means between the frame and each of the rear wheels, said U-shaped spring means having upper and lower legs spaced apart and disposed normal to the axis of rotation of said rear wheels, one end of each said U-shaped spring means forming a journal, an axle journalled in each said wheel and said U-shaped spring means, means to suspend said caster wheels spaced apart on said cart including single leaf type spring means extending transversely of said cart between the frame and the front caster wheels, said caster wheels being attached to the ends of said leaf spring means, and means defining plastic bearing means for each said wheels, said leaf type spring means being shorter than the distance between said rear wheels whereby said front caster wheels on said cart may pass between the rear wheels on similar carts for nesting with said similar carts and whereby the wheels so suspended may be relatively thin with less tread area producing less friction with a floor.

8. In a shopping cart having a frame and one or more package supporting means adapted to be loaded with merchandise, said frame and package supporting means including means for permitting said carts to be telescoped with similar parts, means including rear wheel means spaced apart at the rear of said cart and front caster wheel means spaced apart at front of said cart, means to suspend said rear wheels on said cart including U-shaped spring means between the frame and each of said rear wheel means, and means to suspend said front caster wheel means on said cart including single leaf-type spring means extending transversely of said cart between the frame and the front caster wheel means, said U-shaped spring means having upper and lower legs spaced apart and disposed normal to the axis of rotation of said wheel means to permit the front caster wheel means of like carts to pass therebetween, said means to suspend said front caster wheel means being shorter than the distance between said rear wheel means whereby the front caster wheel means of said cart may pass between the rear wheels of similar carts for nesting with similar carts.

References Cited in the file of this patent

UNITED STATES PATENTS

| 669,418 | Lanciaux | Mar. 5, 1901 |
| 2,622,949 | Cotchett | Dec. 23, 1952 |
| 2,642,924 | Gill | June 23, 1953 |

FOREIGN PATENTS

| 699,024 | France | Dec. 8, 1930 |